July 22, 1930.   G. L. ABBOTT   1,770,896
WIPER AND LAMINATED STRUCTURE DEVELOPED IN ITS MANUFACTURE
Filed Oct. 26, 1927
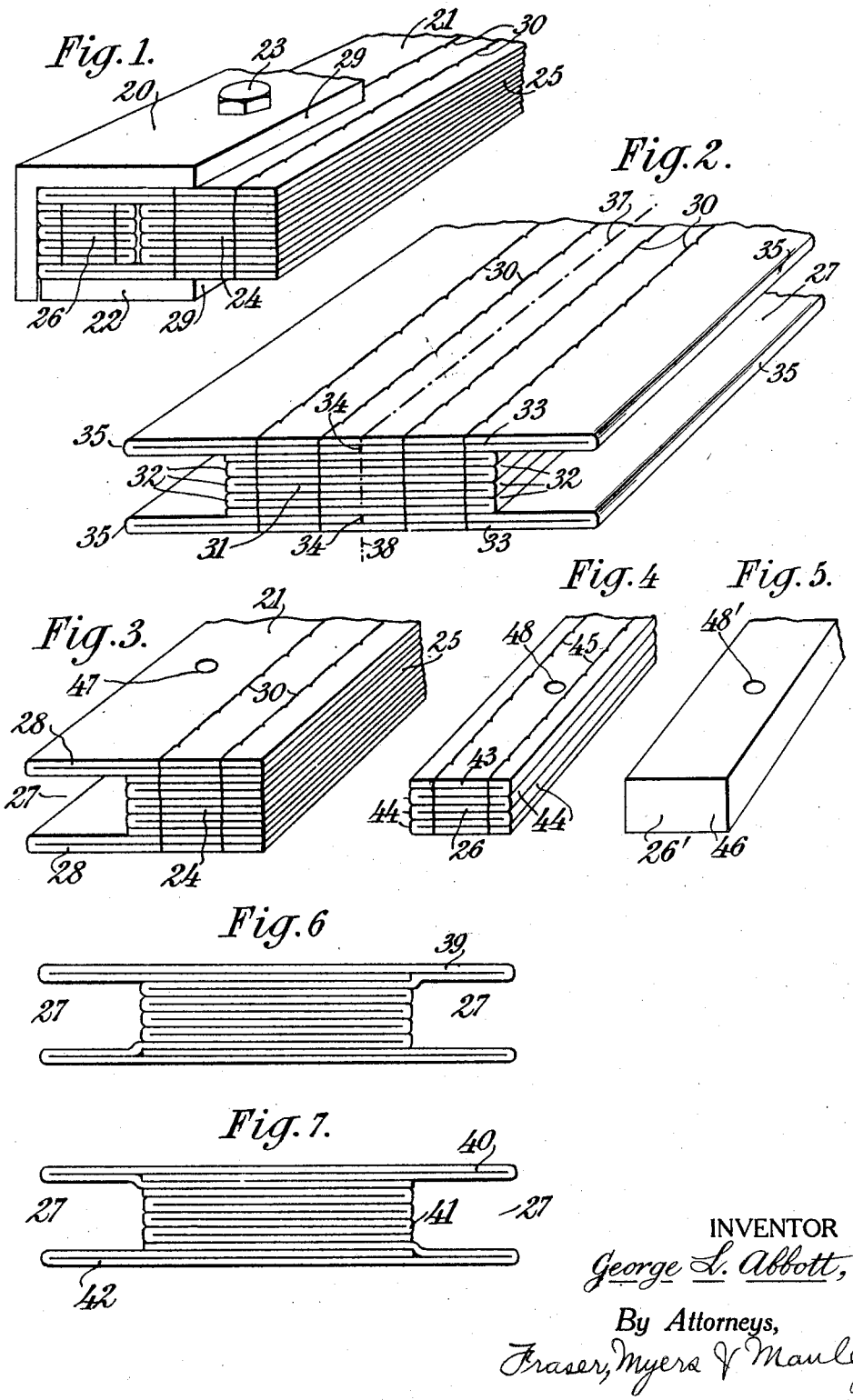

Patented July 22, 1930

1,770,896

UNITED STATES PATENT OFFICE

GEORGE L. ABBOTT, OF PALMYRA, NEW YORK, ASSIGNOR TO THE GARLOCK PACKING COMPANY, OF PALMYRA, NEW YORK, A CORPORATION OF NEW YORK

WIPER AND LAMINATED STRUCTURE DEVELOPED IN ITS MANUFACTURE

Application filed October 26, 1927. Serial No. 228,770.

This invention relates to an improved wiper of a type which, if constructed of suitable material, is adapted for use as a means whereby surplus metal may be removed from the rolls of machines employed in the coating of sheets of metal with tin.

It is an object of the invention to provide a wiper a material portion of which is readily detachable so as to be easily removed after the wiper has served its purpose and is to be discarded, the removed portion being adapted for insertion in a new wiper, thereby resulting in a saving of material to an extent dependent upon the relative size of the permanent removable portion of the wiper as compared with the size of the worn wiper which is discarded. If desired, the removable portion, or filler, may be a fixed part of the holder with which the wiper is used, so as to be separated from the wiper by the removal of the wiper from the holder.

It is a further object of the invention to construct a wiper of the above-described character which will have a smooth and even working surface adapted to contact with the surface of the roll of the tinning machine from end to end, without being dependent upon preliminary trimming or fitting.

A still further object of the invention is to produce a novel form of laminated structure from which two wipers of the above-described character can be made by a single cut through its body portion, the severed portions of the separated parts of the structure serving as the working surfaces.

In the accompanying drawings illustrating preferred forms of the invention—

Figure 1 is a perspective view of an end portion of a wiper made in accordance with the above-described invention, said wiper being clamped in a holder, one end portion only of which is illustrated.

Fig. 2 is a similar perspective view of an end portion of a laminated structure from which a pair of wipers each like the one illustrated in Fig. 1 may be constructed, by severing the structure along the plane indicated by broken lines midway between its edges.

Fig. 3 is a similar view of an end portion of a wiper like the one illustrated in Fig. 1, with its core or filler removed.

Fig. 4 is a similar view of an end portion of the removed core or filler.

Fig. 5 is a similar view of an end portion of a modified form of core or filler.

Fig. 6 is an end view of a modified form of laminated structure similar to the one illustrated in Fig. 2.

Fig. 7 is an end view of a second modified form of laminated structure.

In Fig. 1, 20 represents a wiper-holder within which may be secured a wiper 21 by means of the clamping plate 22 and securing devices, one of which is illustrated as a bolt having a head 23. The wiper is indicated as comprising a body portion 24, having a working surface 25 adapted to be applied to the surface to be wiped or cleaned by the wiper when in use. The wiper is also indicated as having a portion adapted to be clamped within the holder, a part of which portion comprises a removable core or filler 26.

In the form of the invention illustrated in Fig. 1, the core is indicated as having been inserted within a channel 27 (Fig. 3) formed by extending surface portions 28 of the wiper beyond the body portion.

It will be apparent that, before the body portion of the wiper wears away to such an extent as to cause its working face to lie in the plane of the lips 29 of the holder, the remainder of the wiper must be discarded and a new wiper substituted therefor.

Heretofore, it has been the practice to make wipers of the above-described character as a single unitary structure, so that the relatively large portion of a worn wiper, removed from the holder when making a renewal, was necessarily discarded, resulting in a heavy loss of material. It is the purpose of the present invention to divide the portion of the wiper intended to be clamped within the holder into two portions, one of which, the core or filler 26, in the form of wiper illustrated in Fig. 1, may be removed from a worn wiper when about to be discarded, and inserted in the new wiper which takes its place.

It will be obvious that any appropriate part of the portion of the wiper which is clamped in the holder may be made separable from a remaining skeleton portion and used as a permanent core or filler, which may be transferred from wiper to wiper for an unlimited number of times. The form of wiper illustrated, in which the core 26 is inserted in a channel 27, has been found satisfactory in that it provides for the removal of the filler from the channel without difficulty, and the portions 28 extending from the body portion of the wiper afford means whereby the wiper may be clamped and secured within the holder as firmly as would be true of a solid wiper.

A wiper of the above-described character may be made in any appropriate manner, and may be constructed of any suitable material. As herein disclosed, it is illustrated as having been made of laminated material preferably built up of folded sheets of asbestos fabric secured together in any appropriate manner, as by rows of stitching 30.

A pair of wipers embodying the invention in its preferred form, as illustrated in Figs. 1 and 2, may be produced by preparing a suitable laminated structure and severing the same along a medial plane, the cut surface of each wiper thus made being adapted for use as a working face.

One form of laminated structure from which a pair of wipers may be made in the above-described manner is illustrated in Fig. 2. This structure may be built up of sheet material, preferably asbestos fabric, by superposing a number of layers such as will have a combined thickness equal to that of the wiper to be made. To give the best results, the laminated structure should comprise one or more sheets of material, folded to produce the desired number of layers, and firmly secured together so as to prevent any distortion or relative movement of the parts of the structure during or after the severing operation by which it is divided to form a pair of wipers.

In the form of the invention illustrated in Fig. 2, the laminated structure comprises three elements of folded asbestos fabric, each element having folds along its opposite margins. The inner element 31 from which the body portions of the wipers are to be made comprises a strip of fabric folded into a plurality of accordion plaits having folds 32 at its opposite margins. The outer elements 33 may have their edge portions folded inwardly so as to meet along the center of the structure as at 34, thus producing folds 35 at the opposite margins.

The three folded elements may be firmly secured together by fastening means of any appropriate character, such, for example, as the rows of stitching 30, after which the structure may be severed along a plane lying between the innermost rows of stitches, and said plane of severance may either be perpendicular to the surface of the structure or may be of any desired inclination, depending upon the angle which it is desired to have the working face of the wiper make with its outer surfaces. In Fig. 2 the wiper is indicated as being severed along a plane determined by the broken lines 37, 38, at right angles to the surfaces of the structure and midway between its margins, thereby producing two wipers each of the size and form indicated in Figs. 1 and 3.

In Fig. 6 is illustrated a modified form of laminated structure made of a single sheet of material 39, so folded that the edges of the material are not exposed and no edges terminate within the plane along which the structure is to be severed.

In the modified form of laminated structure illustrated in Fig. 7 three sheets of material 40, 41, 42 are used, the edges of none of which terminate in the plane along which the structure is to be severed.

In building up the laminated structure from which the wipers are to be made, it is important that the folds be so disposed as to leave a space in the portion of the wiper intended to be clamped in the holder, within which the core or filler may be inserted. In the forms of the invention herein disclosed, this has been accomplished by making the folds of different widths and by placing the folds of greatest width at the opposite surfaces of the structure, thus producing recesses or channels 27 to receive the cores of the completed wipers.

In Fig. 4 is illustrated a preferred form of core or filler such as may be made by superposing one or more sheets of material, preferably asbestos fabric, and securing the same together. The core illustrated in Fig. 4 comprises a single sheet of fabric 43 folded into a plurality of accordion plaits with the folds 44 disposed along opposite margins, the various layers being secured together by rows of stitching 45.

In Fig. 5 is illustrated a modified form of core, which may comprise a solid block 46 of steel, iron, or other appropriate material. If desired, such solid block or filler may constitute a permanent part of the holder with which a channeled wiper embodying the invention is intended to be used.

The making of the wiper from a laminated structure comprising sheet material having folds along its margins and firmly secured together is of importance in that the folded elements and the stitching or other securing means contribute to prevent any relative movement between the layers of the structure during the severing operation, such as has been found to take place when attempts have been made to sever a structure comprising a plurality of separately cut layers.

The finished wiper as illustrated in Fig. 3 may be provided with perforations one of which is shown at 47, and the core may be provided with perforations one of which is indicated at 48 (Fig. 4) and another at 48' (Fig. 5), to receive the fastening element by which the wiper is secured in the holder.

The wiper is assembled by placing the core 26 (Fig. 4) or 26' (Fig. 5) within the channel 27 of the wiper (Fig. 3), and the combined structure is inserted in the holder 20 and secured in place between the holder and the clamping plate 22 by the fastening elements 23.

It will be apparent that the above-disclosed invention results in a relatively large saving of material since it is necessary from time to time to disassemble machines in which such wipers are used, for purposes of repair or replacement, and the wipers removed at such times cannot be satisfactorily replaced but must be discarded and new ones have to be substituted therefor. Heretofore, it has been the practice to discard the entire unused portion of the wiper including all of the part which is clamped within the holder, as well as the unused portion extending beyond the same. The present invention provides a wiper of which a relatively large part of the portion clamped within the holder, as, for example, the core or filler 26, is of a permanent character, which may be removed from a wiper to be discarded and inserted in a new wiper, and which may therefore be used for an indefinite period. The amount of discarded material is therefore reduced to the relatively thin skeleton or shell of material which is filled out or completed by the permanent core.

The invention is not intended to be limited to the specific forms of invention herein disclosed for purposes of illustration but should be regarded as including modifications and variations thereof within the scope of the appended claims.

What is claimed is:

1. A wiper having a solid working portion subject to wear and an attaching portion adapted to be clamped in a holder, said attaching portion comprising an extension of a part of the material of the working portion, and readily attachable and detachable filling material of a crosssectional area complemental to that of the attaching portion.

2. A wiper comprising a unitary structure having a solid working portion subject to wear and an attaching portion adapted to be secured to a holder, the attaching portion being channeled to receive a readily detachable filler.

3. A heat-resistant wiper comprising layers of asbestos fabric of different widths bound together with the layers of greater width extended beyond the others at one side of the structure to form a skeleton portion adapted to be completed by the addition of readily separable filling material and attached to a holder, the opposite side of the structure having a trimmed surface adapted to serve as a wearing face.

4. A heat-resistant wiper, as defined by claim 3, having its wider layers at opposite surface portions of the structure, thus providing a channeled skeleton portion.

5. A heat-resistant wiper comprising layers of asbestos fabric of varying widths superimposed and secured together to form a unitary structure having one edge of each layer in a common plane thus forming an even surface adapted for use as a working face and having parts of the layers of greatest width extended to form a skeleton portion to be secured in a holder, and a readily removable filler of heat-resistant material to fill out the skeleton portion.

6. A laminated structure, adapted for use in making wipers, comprising layers of folded sheet material of different widths superimposed and secured together with the layers of greater width extended at opposite sides to form a skeleton portion at each of said sides to receive filling material and be secured to a holder, said structure being adapted to be severed along a plane intermediate said skeleton portions to produce a pair of wipers.

7. A laminated structure, adapted for use in making heat-resistant wipers comprising layers of folded asbestos fabric of different widths superimposed and stitched together with the layers of greater width extended at opposite sides to form a skeleton portion at each of said sides to receive filling material and be secured to a holder, said structure being adapted to be severed along its central portion between the stitching to produce a pair of wipers.

8. A laminated structure, adapted for use in making wipers, comprising layers of folded sheet material superimposed and secured together, the surface folds being of greater width than the intervening folds, thereby providing channels in the opposite marginal portions of the structure for the insertion of fillers, said structure being adapted to be severed along a plane intermediate said channeled marginal portions to produce a pair of wipers.

In witness whereof, I have hereunto signed my name.

GEORGE L. ABBOTT.